(12) United States Patent
Chikada (10) Patent No.: US 9,381,842 B2
(45) Date of Patent: Jul. 5, 2016

(54) ASSIST GRIP ATTACHMENT STRUCTURE (75) Inventor: Shimpei Chikada, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/355,029

(22) PCT Filed: Jul. 5, 2012

(86) PCT No.: PCT/JP2012/067234
§ 371 (c)(1),
(2), (4) Date: Apr. 29, 2014

(87) PCT Pub. No.: WO2013/065357
PCT Pub. Date: May 10, 2013

(65) Prior Publication Data
US 2014/0312643 A1 Oct. 23, 2014

(30) Foreign Application Priority Data
Oct. 31, 2011 (JP) .................. 2011-238441

(51) Int. Cl.
*B60N 3/02* (2006.01)

(52) U.S. Cl.
CPC . *B60N 3/026* (2013.01); *B60N 3/02* (2013.01)

(58) Field of Classification Search
CPC ............ B60N 3/02; B60N 3/026; B60N 2/24; B60N 3/023; B60N 2/02; B60N 2/466; B60N 2/4693; B60N 2/002; B60N 2/464; B60N 3/063; B60J 5/0468; B61D 37/00; B62D 23/00; B62D 23/005; B62D 25/06; B62D 25/20; B62D 33/02; B62D 33/0625; B62D 61/10; B60R 21/131; B60R 11/0235; B60R 11/0252; B60R 11/0258; B60R 13/005; B60R 2011/0078; B60R 21/055; B60R 2021/028; B60R 21/045; B60R 21/34
USPC ............... 296/71, 217, 39.1, 97.9; 280/730.2; 16/445, 404
See application file for complete search history.

(56) References Cited

U.S. PATENT DOCUMENTS

| 6,467,130 | B2 * | 10/2002 | Kurachi | ................. | B60N 3/023 |
|---|---|---|---|---|---|
| | | | | | 16/418 |
| 6,616,222 | B1 * | 9/2003 | Ponceau | ................ | B60N 3/023 |
| | | | | | 16/445 |

(Continued)

FOREIGN PATENT DOCUMENTS

| JP | A-2003-137012 | 5/2003 |
|---|---|---|
| JP | A-2007-55420 | 3/2007 |

OTHER PUBLICATIONS

Office Action issued in Japanese Patent Application No. 2011-238441 dated May 27, 2014 (with translation).

*Primary Examiner* — Glenn Dayoan
*Assistant Examiner* — Sunsurraye Westbrook
(74) *Attorney, Agent, or Firm* — Oliff PLC (57) ABSTRACT

An assist grip attachment structure in which an assist grip is attached to a vehicle body-side attachment portion, the assist grip is supported with prescribed rigidity by the vehicle body-side attachment portion when a tensile load in a direction in which the assist grip is pulled toward an inside of a vehicle cabin is applied to the assist grip, and an impact of a pressing load is absorbed through deformation of the vehicle body-side attachment portion when the pressing load is applied to the assist grip from the inside of the vehicle cabin.

4 Claims, 6 Drawing Sheets

(56) References Cited

U.S. PATENT DOCUMENTS

| | | | | |
|---|---|---|---|---|
| 6,715,813 B2* | 4/2004 | Thompson | ............. | B60N 3/023 16/438 |
| 6,869,119 B2* | 3/2005 | Ito | ............. | B60N 3/026 296/1.02 |
| 2005/0028323 A1* | 2/2005 | Meyer | ............. | B60N 3/023 16/445 |
| 2006/0143868 A1* | 7/2006 | Bauer | ............. | B60N 3/023 16/438 |
| 2008/0174145 A1* | 7/2008 | Saionji | ............. | B60N 3/023 296/146.1 |

\* cited by examiner

ASSIST GRIP ATTACHMENT STRUCTURE

TECHNICAL FIELD

The invention relates to an assist grip attachment structure, and more specifically to an attachment structure in which an assist grip is supported with prescribed rigidity against a tensile load and an impact of a pressing load is appropriately absorbed through deformation.

BACKGROUND ART

There has been proposed an assist grip attachment structure in which an assist grip is attached to a vehicle body-side attachment portion, the assist grip is supported with prescribed rigidity by the vehicle body-side attachment portion when a tensile load in a direction in which the assist grip is pulled toward the inside of a vehicle cabin is applied to the assist grip, and an impact of a pressing load is absorbed through deformation of the vehicle body-side attachment portion when the pressing load is applied to the assist grip from the inside of the vehicle cabin. An example of such an assist grip attachment structure is a device described in Patent Document 1, in which each bracket (vehicle body-side attachment portion) having an attachment plate portion, to which an assist grip is attached, is provided with three leg portions, the assist grip is fixed to a roof side rail inner panel via the three leg portions, the assist grip is supported with high rigidity by the three leg portions against a tensile load, and an impact of a pressing load is absorbed through bending deformation of the attachment plate portion in addition to deformation of the leg portions each having a small width.

PRIOR ART DOCUMENT

Patent Document

Patent document 1: Japanese Patent Application Publication No. 2003-137012

SUMMARY OF THE INVENTION

Problem To Be Solved By The Invention

However, in such a conventional assist grip attachment structure, because an impact of a pressing load is absorbed through bending deformation of the attachment plate portion, there is a problem that it is difficult to achieve both ensuring of support rigidity against a tensile load and impact absorbing performance of absorbing an impact of a pressing load.

The invention is made in light of the above-described circumstances, and one object of the invention is to provide an attachment structure that makes it possible to easily achieve both ensuring of support rigidity with which an assist grip is supported against a tensile load applied to the assist grip and impact absorbing performance of absorbing an impact of a pressing load.

Means for Solving the Problem

To achieve the object, the first aspect of the invention provides an assist grip attachment structure in which an assist grip is attached to a vehicle body-side attachment portion, the assist grip is supported with prescribed rigidity by the vehicle body-side attachment portion when a tensile load in a direction in which the assist grip is pulled toward an inside of a vehicle cabin is applied to the assist grip, and an impact of a pressing load is absorbed through deformation of the vehicle body-side attachment portion when the pressing load is applied to the assist grip from the inside of the vehicle cabin, the assist grip attachment structure characterized by comprising: (a) a low-rigidity portion provided in the vehicle body-side attachment portion; (b) a high-rigidity portion provided in the vehicle body-side attachment portion and having rigidity higher than rigidity of the low-rigidity portion; (c) a pressing-side engagement portion that is fixedly fitted to the assist grip, that is engaged with the low-rigidity portion, and that presses and deforms the low-rigidity portion from the inside of the vehicle cabin when the pressing load is applied to the assist grip; and (d) a tension-side engagement portion that is fixedly fitted to the assist grip, and that is engaged with the high-rigidity portion from a side opposite to the inside of the vehicle cabin when the tensile load is applied to the assist grip.

The second aspect of the invention provides the assist grip attachment structure recited in the first aspect of the invention, characterized in that: (a) the vehicle body-side attachment portion has an attachment plate portion having an engagement hole in which an attachment end portion of the assist grip is inserted from the inside of the vehicle cabin and is engaged; and (b) cuts are formed along the engagement hole of the attachment plate portion in a vicinity of the engagement hole, a portion located inward of the cuts is used as the low-rigidity portion, and a portion located outward of the cuts is used as the high-rigidity portion.

The third aspect of the invention provides the assist grip attachment structure recited in the second aspect of the invention, characterized by comprising (a) a clip that has a hat-shaped section and has a pair of flange portions located on opposite sides of a protruded portion, the attachment end portion of the assist grip being fixedly fitted to an inner side of the protruded portion, wherein (b) the protruded portion of the clip is inserted into the engagement hole from the inside of the vehicle cabin, and the pair of flange portions of the clip is engaged with the low-rigidity portion from the inside of the vehicle cabin, the pair of flange portions serving as the pressing-side engagement portion, (c) in a pair of sidewalls of the protruded portion of the clip, a pair of engagement lugs is formed in such a manner that sides of the engagement lugs, which are close to the flange portions, are cut and raised so as to protrude outward from the protruded portion, when the protruded portion is inserted into the engagement hole from the inside of the vehicle cabin, the engagement lugs are elastically deformed inward, so that the protruded portion is allowed to pass through the engagement hole and the engagement lugs are engaged with the high-rigidity portion from the side opposite to the inside of the vehicle cabin, the pair of engagement lugs serving as the tension-side engagement portion, and (d) the clip is assembled to the attachment plate portion in such a manner that an inner peripheral edge portion around the engagement hole in the attachment plate portion is located between the pair of flange portions and the pair of engagement lugs.

Effects of the Invention

In the assist grip attachment structure as described above, the low-rigidity portion and the high-rigidity portion are formed in the vehicle body-side attachment portion to which the assist grip is attached, and when the pressing load is applied to the assist grip, the pressing-side engagement portion fixedly fitted to the assist grip presses and deforms the low-rigidity portion from the inside of the vehicle cabin, so that an impact of the pressing load is appropriately absorbed through the deformation of the low-rigidity portion. When the tensile load is applied to the assist grip, the tension-side engagement portion fixedly fitted to the assist grip is engaged with the high-rigidity portion from the side opposite to the inside of the vehicle cabin, so that the assist grip is supported with high rigidity by the high-rigidity portion. In this case, because the support rigidity with which the assist grip is supported against the tensile load is ensured by the rigidity of the high-rigidity portion, and the impact absorbing performance of absorbing an impact of the pressing load is appropriately set by adjusting the degree of weakness (ease of deformation) of the low-rigidity portion, it is possible to easily achieve both securing of the support rigidity against the tensile load and the impact absorbing performance of absorbing an impact of the pressing load.

In the second aspect of the invention, the attachment plate portion has the engagement hole, in which the attachment end portion of the assist grip is inserted from the inside of the vehicle cabin and is engaged, and the cuts are formed around the engagement hole and along the engagement hole, the portion located inward of the cuts is used as the low-rigidity portion, and the portion located outward of the cuts is used as the high-rigidity portion. Therefore, by appropriately setting the position, the depth, the length, or the like of the cuts, it is possible to easily adjust the degree of weakness of the low-rigidity portion, that is, the impact absorbing performance of absorbing an impact of the pressing load without affecting the support rigidity against the tensile load.

In the third aspect of the invention, the clip having a hat-shaped section is provided, and the attachment end portion of the assist grip is attached to the vehicle body-side attachment portion via the clip. By just inserting the pair of engagement lugs into the engagement hole from the protruded portion having a hat-shaped section while elastically deforming the pair of engagement lugs, the clip is assembled to the attachment plate portion, and the attachment end portion of the assist grip is attached to the vehicle body-side attachment portion via the clip. Moreover, in the attachment state, the inner peripheral edge portion around the engagement hole of the attachment plate portion is located between the flange portions, which serve as the pressing-side engagement portions, and the engagement lugs, which serve as the tension-side engagement portions. When the pressing load is applied to the assist grip, the flange portions are engaged with the low-rigidity portion from the inside of the vehicle cabin, so that an impact of the pressing load is appropriately absorbed through the deformation of the low-rigidity portion. On the other hand, when the tensile load is applied to the assist grip, the engagement lugs are engaged with the high-rigidity portion from the side opposite to the inside of the vehicle cabin, so that the assist grip is supported with high rigidity. That is, in the third aspect of the invention, it is possible to easily attach the attachment end portion of the assist grip to the vehicle body-side attachment portion via the clip. Further, the clip is provided with the flange portions and the engagement lugs, which serve as the pressing-side engagement portions and the tension-side engagement portions, respectively. In addition, the low-rigidity portion is formed in the inner peripheral edge portion around the engagement hole of the attachment plate portion by the cuts. Provision of the flange portions and the engagement lugs in addition to formation of the low-rigidity portion makes it possible to easily and inexpensively obtain an attachment structure that makes it possible to appropriately achieve both the impact absorbing performance of absorbing an impact of the pressing load and the support rigidity against the tensile load.

MODES FOR CARRYING OUT THE INVENTION

The invention is preferably applied to an attachment structure for attaching an assist grip to a roof side rail inner member of a vehicle, but is also applicable to an attachment structure for attaching an assist grip to other vehicle body panels such as a center pillar inner member. The vehicle body-side attachment portion may be formed integrally with a vehicle body panel such as a roof side rail inner member, but may also be formed separately from a vehicle body panel and fixed to the vehicle body panel by welding or the like. For example, a grip attachment bracket having: (a) a flat attachment plate portion to which an attachment end portion of an assist grip is attached; and (b) a plurality of leg portions formed so as to be continuous from an outer peripheral edge of the attachment plate portion, fixedly fitted to a vehicle body panel, and supporting the attachment plate portion such that the attachment plate portion is apart from the vehicle body panel, may be used as the vehicle body-side attachment portion. The number of the plurality of leg portions is preferably three or more in order to ensure prescribed rigidity, but may be only two. Further, the leg portions may be endowed with a function of absorbing an impact of a pressing load through their bending deformation, which differs from deformation of the low-rigidity portion, when a pressing load is applied to the assist grip.

The vehicle body-side attachment portion according to the second aspect of the invention has the attachment plate portion having the engagement hole in which the attachment end portion of the assist grip is inserted. However, in the first aspect of the invention, for example, a threaded hole or the like may be formed in the low-rigidity portion of the attachment plate portion to fix the attachment end portion of the assist grip to the attachment plate portion, and the tension-side engagement portion that is engageable with the high-rigidity portion may be formed integrally with the opposite side of the low-rigidity portion (the side opposite to the inside of the vehicle cabin). That is, it is not necessary to adopt the configuration in which the attachment end portion of the assist grip is inserted into an engagement hole. Thus, it is possible to implement the invention in various modes. In the case where the attachment end portion is inserted into the engagement hole from the inside of the vehicle cabin as in the second aspect of the invention, for example, a vehicle-cabin-inside-portion of the attachment end portion, which is not inserted in the engagement hole, may be provided with the pressing-side engagement portion that is engageable with the low-rigidity portion, and a protruding portion of the attachment end portion, which protrudes from the engagement hole toward the opposite side (the side opposite to the inside of the vehicle cabin), may be provided with the tension-side engagement portion that is engageable with the high-rigidity portion.

In the second aspect of the invention, the low-rigidity portion is formed by forming the cuts along the engagement hole of the attachment plate portion in the vicinity of the engagement hole. However, in the other aspect of the invention, for example, a low-rigidity member having low material strength may be fixedly fitted to the attachment plate portion, or a low-rigidity member that is structurally low in rigidity, such as a cantilever member, may be fixedly fitted to the attachment plate portion, in other words, various kinds of low-rigidity portions may be adopted. In the case where the low-rigidity portion is formed by forming the cuts as in the second aspect of the invention, each cut may pass through the attachment plate portion like a slit, or each cut may be a bottomed cut like a groove having a V-shaped section. These cuts can be formed by laser processing, partial trimming, metal stamping (engraving), or the like. It is not necessary to form the cuts along the whole circumference of the engagement hole as long as the low-rigidity portion is deformed due to engagement with the pressing-side engagement portion, so that an impact of a pressing load is absorbed through deformation.

In the third aspect of the invention, the attachment end portion of the assist grip is attached to the attachment plate portion via the clip having a hat-shaped section, and the clip is provided with the pair of flange portions and the pair of engagement lugs. However, for example, sidewalls may be provided on four sides of the rectangular attachment plate portion, a flange portion and an engagement lug may be provided on each of the four sidewalls, a total of four flange portions may be used as the pressing-side engagement portion, and a total of four engagement lugs may be used as the tension-side engagement portion. A plurality of engagement lugs may be provided on each one of the sidewalls. Such a clip is fixedly fitted to the attachment end portion of the assist grip by welding, an adhesive, screwing, or the like before being assembled to the vehicle body-side attachment portion, and inserted into the engagement hole of the attachment plate portion from the protruded portion to be assembled to the vehicle body-side attachment portion. However, the attachment end portion of the assist grip may be fixedly fitted to the inner side of the protruded portion after the clip is solely assembled to the vehicle body-side attachment portion.

EMBODIMENT

Hereinafter, an embodiment of the invention will be described in detail with reference to the drawings.

Figure 1:
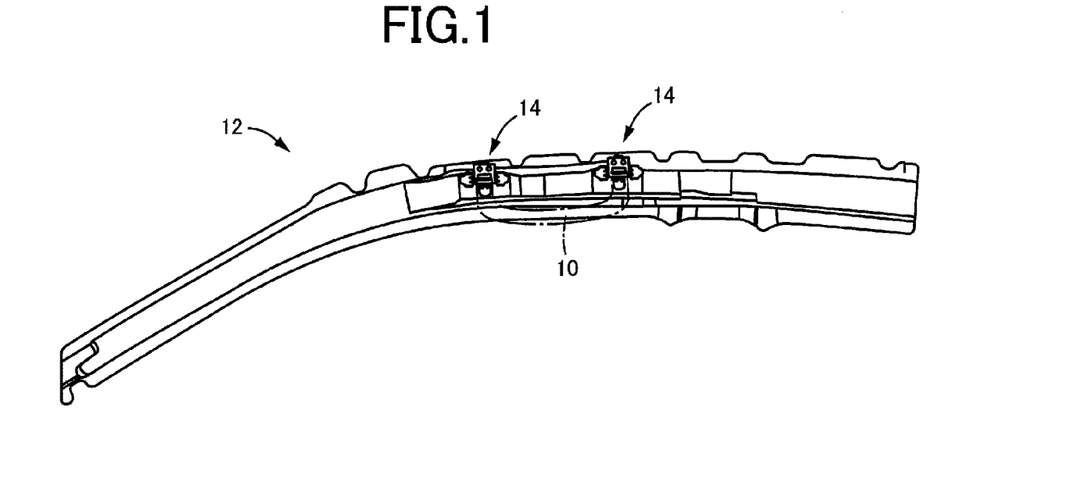
FIG. 1 is a front view illustrating an example of a roof side rail inner member to which the assist grip is attached with the use of an attachment structure according to the invention.

FIG. 1 is a front view illustrating an example of a roof side rail inner member 12 to which an assist grip 10 is attached with the use of an attachment structure according to the invention. The roof side rail inner member 12 is disposed above a driver's seat on the right side of a vehicle, and grip attachment brackets 14 are fixedly fitted respectively to a pair of attachment portions to which a pair of attachment end portions 10e (see FIG. 4, for example) of a flat U-shaped assist grip 10 are respectively attached. Each grip attachment bracket 14 corresponds to a vehicle body-side attachment portion.

Figure 2:
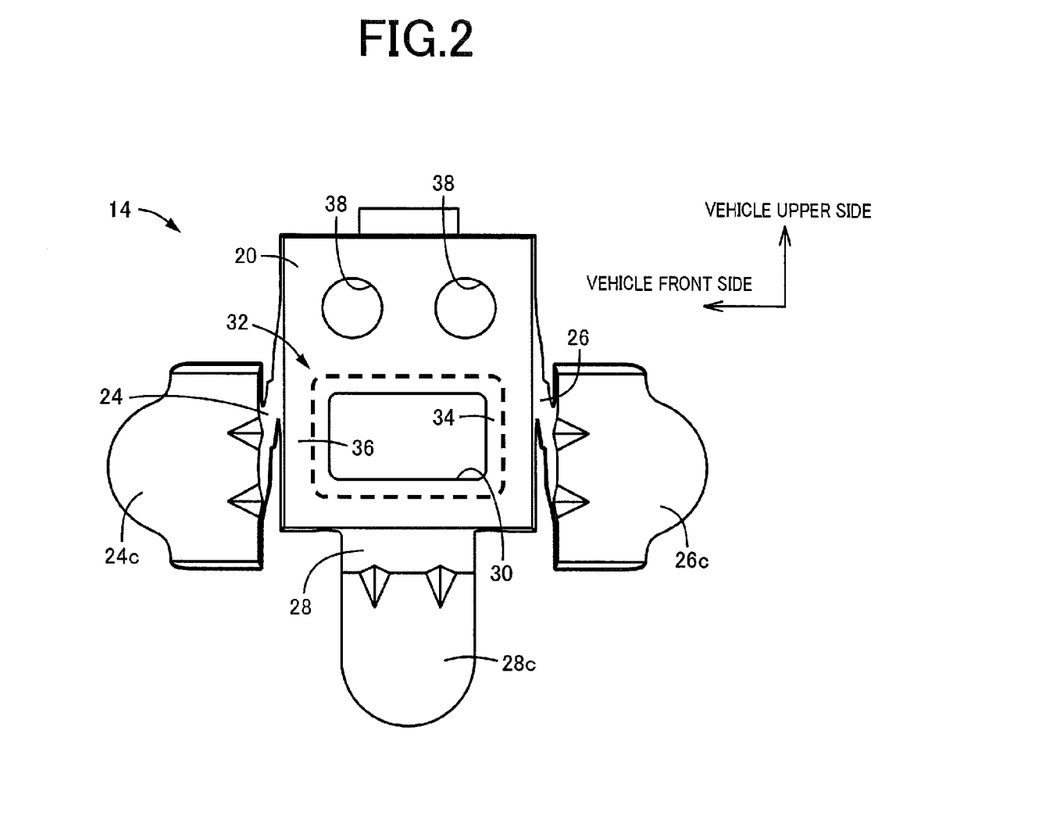
FIG. 2 is a front view illustrating the grip attachment bracket is fixedly fitted to the rood side rail inner member of FIG. 1 alone.
Figure 3:
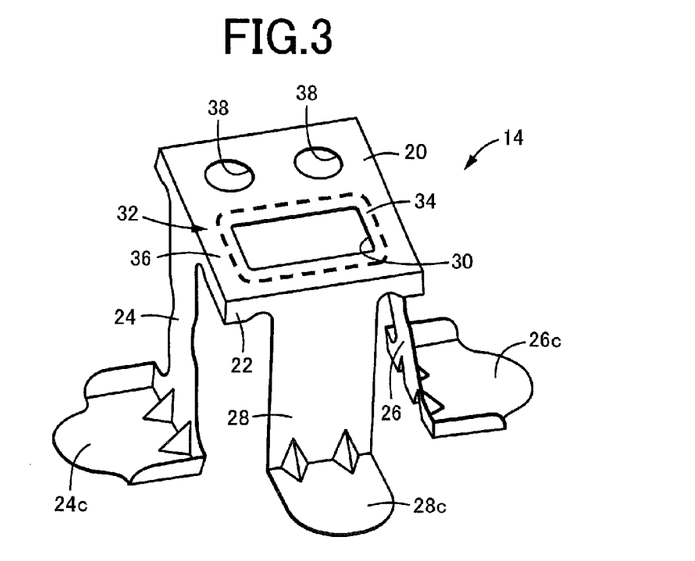
FIG. 3 is a perspective view of the grip attachment bracket of FIG. 2.

FIG. 2 is a front view illustrating the grip attachment bracket 14 alone as viewed from substantially the same direction as the direction from which the components in FIG. 1 are viewed. FIG. 3 is a perspective view of the grip attachment bracket 14. The grip attachment bracket 14 is a pressed part, and has: a flat rectangular (a right-angled quadrangle) attachment plate portion 20 to which the attachment end portion 10e of the assist grip 10 is attached; a reinforcement frame portion 22 formed into a rectangular tubular shape by being bent at a substantially right angle along an outer peripheral edge of the attachment plate portion 20; and three leg portions 24, 26, 28 that extend so as to be continuous from the reinforcement frame portion 22. The reinforcement frame portion 22 formed into a rectangular cylindrical shape may be joined to the attachment plate portion 20 by welding or the like. Joint portions 24c, 26c, 28c each bent at a substantially right angle so as to extend outward are provided at ends of the leg portions 24, 26, 28, respectively, and each of the joint portions 24c, 26c, 28c is integrated by welding with a joint seating face of the roof side rail inner member 12. Thus, the attachment plate portion 20 is supported in a state where the attachment plate portion 20 is apart from the roof side rail inner member 12 by a prescribed distance, that is, in a state where the attachment plate portion 20 protrudes inward in the vehicle.

The leg portions 24, 26 are formed so as to extend at a substantially right angle from respective two sides of the attachment plate portion 20 located in the front-back direction of the vehicle (the right-left direction in FIG. 2), and each of the leg portions 24, 26 has a width smaller than that of the leg portion 28 formed so as to extend at a substantially right angle from a side of the attachment plate portion 20 on a vehicle lower side. Therefore, when a pressing load Fpr in the vehicle upward direction or outward direction (vehicle rightward direction) is applied to the assist grip 10 attached to the attachment plate portion 20, the leg portion 28 topples in the vehicle upward direction, the leg portions 24, 26 are deformed so as to bend, and an impact of the pressing load Fpr is absorbed through the bending deformation of the leg portions 24, 26. When an occupant such as a driver grips the assist grip 10 and a tensile load Fex in the vehicle downward direction or inward direction (vehicle leftward direction) is applied to the assist grip 10, the leg portions 24, 26 serve as pulled portions, the wide leg portion 28 serves as a support portion (brace), and the assist grip 10 is supported with prescribed rigidity.

Figure 4:
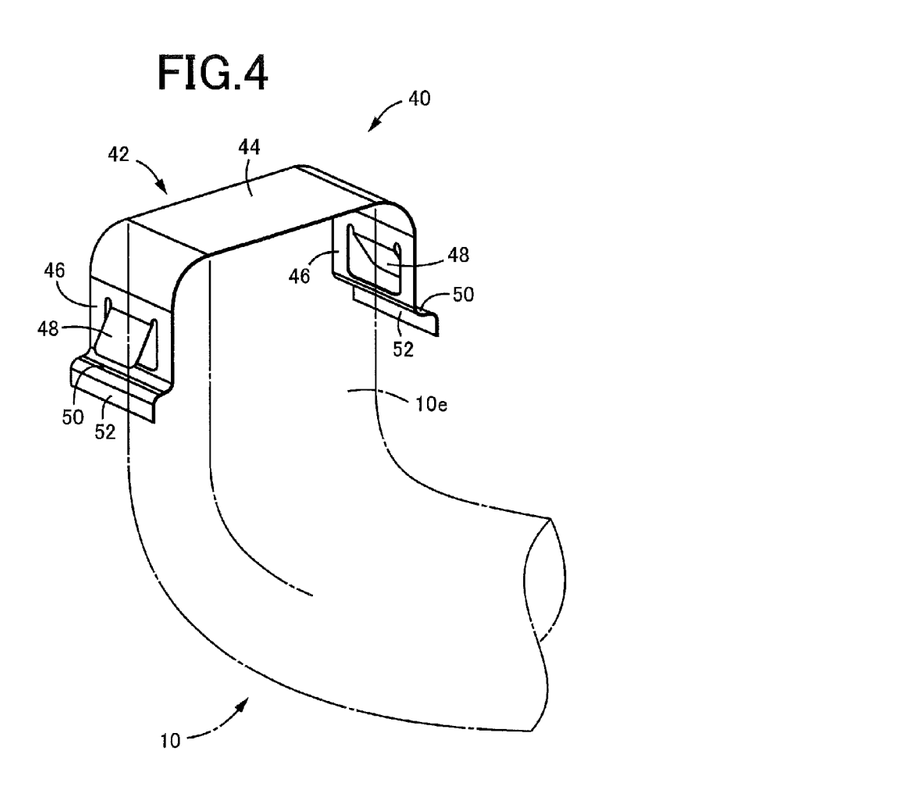
FIG. 4 is a perspective view of the clip fitted to the attachment end portion of the assist grip and connected to the grip attachment bracket of FIG. 2.

A rectangular engagement hole 30 is formed in the attachment plate portion 20 at a position offset from connection portions, at which the leg portions 24, 26 located on the opposite sides of the attachment plate portion 20 are connected to the attachment plate portion 20, toward the leg portion 28, that is, toward the lower side of the vehicle in a state where the grip attachment bracket 14 is fixedly fitted to the roof side rail inner member 12, so that the attachment end portion 10e of the assist grip 10 is attached to the attachment plate portion 20 via a clip 40 illustrated in FIG. 4. Slits 32 are intermittently formed along the engagement hole 30, in the form of a broken line, in the vicinity of the engagement hole 30, a portion located inward of the slits 32 is used as a low-rigidity portion 34, and a portion located outward of the slits 32 is used as a high-rigidity portion 36. The low-rigidity portion 34 is a weak portion that is easily deformed and has rigidity lower than that of the high-rigidity portion 36 located outward of the slits 32. In the present embodiment, portions located on both sides of the engagement hole 30 in its longitudinal direction, that is, on both sides of the engagement hole 30 in the front-back direction of the vehicle are each used as the low-rigidity portion 34. With regard to the high-rigidity portion 36, portions located on both sides of the engagement hole 30 in its longitudinal direction are each used as the high-rigidity portion 36. Each slit 32 corresponds to a slit, and is formed so as to pass through the attachment plate portion 20 by laser processing or the like. In the present embodiment, the slits 32 are formed along the whole circumference of the engagement hole 30. Note that, a plurality of through-holes 38 is formed in another portion of the attachment plate portion 20, so that weight reduction is achieved while prescribed rigidity is ensured.

Figure 5:
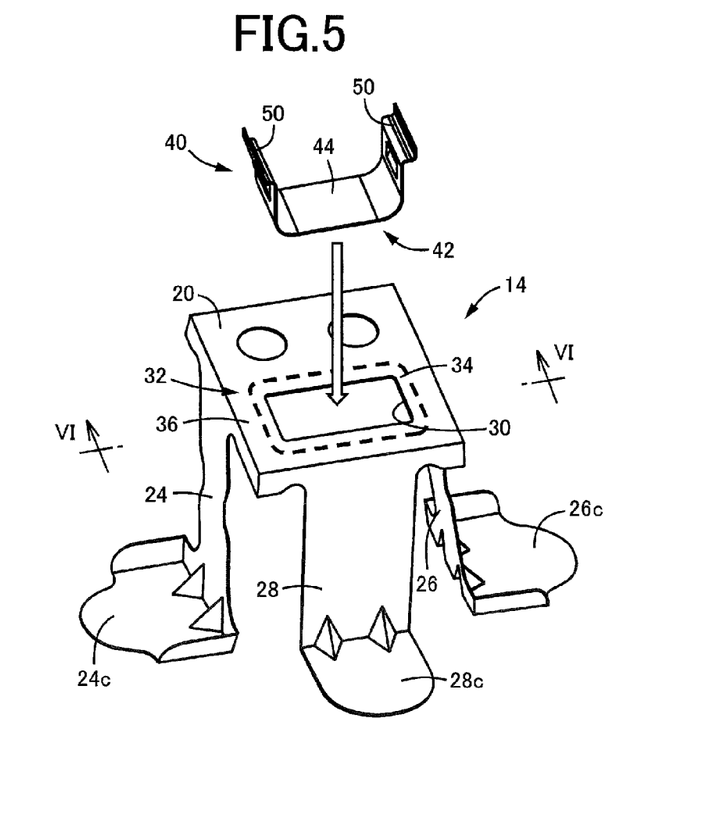
FIG. 5 is a perspective view for explaining an assembled method when the clip of FIG. 4 is assembled to the grip attachment bracket of FIG. 2.

As illustrated in a perspective view of FIG. 4, the clip 40 has a hat-shaped section, and has a pair of flange portions 50 bent outward at substantially a right angle and located on the opposite sides of a protruded portion 42. The attachment end portion 10e of the assist grip 10 is fixedly fitted to an inner face of an end wall 44 of the protruded portion 42 by welding, an adhesive, screwing, or the like. The width of the protruded portion 42 (the dimension in the longitudinal direction of the flange portions 50) is slightly smaller than the width of the engagement hole 30. As illustrated in FIG. 5, the protruded portion 42 is inserted into the engagement hole 30 from the inside of the vehicle cabin, and the pair of flange portions 50 is engaged with the low-rigidity portion 34 that is located inward of the slits 32 and that is an inner peripheral edge portion around the engagement hole 30. Further, bent end portions 52 that are bent at a substantially right angle so as to extend in a direction away from the protruded portion 42 are formed on the outer sides of the flange portions 50.

Figure 6:
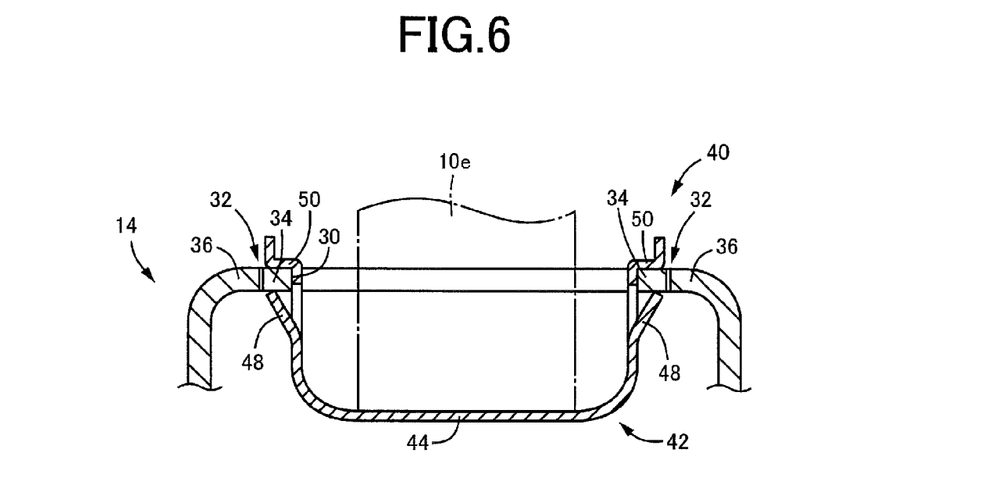
FIG. 6 is a sectional view taken along the line indicated by arrows VI-VI in FIG. 5 in an assembled state where the clip is assembled to the grip attachment bracket.

In a pair of sidewalls 46 of the protruded portion 42 of the clip 40, there are provided engagement lugs 48 formed such that the sides close to the flange portions 50 are cut and raised so as to protrude outward from the protruded portion 42. When the protruded portion 42 is inserted into the engagement hole 30 from the inside of the vehicle cabin, the engagement lugs 48 are engaged with the engagement hole 30 and elastically deformed inward, so that the protruded portion 42 is allowed to pass through the engagement hole 30. Then, when the protruded portion 42 is inserted into the engagement hole 30 until the flange portions 50 come into contact with the attachment plate portion 20 as illustrated in FIG. 6, the engagement lugs 48 also pass through the engagement hole 30, are elastically restored so as to protrude outward from the protruded portion 42, and engaged with the inner peripheral edge portion around the engagement hole 30 from the side opposite to the inside of the vehicle cabin. Thus, the inner peripheral edge portion around the engagement hole 30 in the attachment plate portion 20 is positioned in a state where the inner peripheral edge portion is held between the pair of flange portions 50 and the pair of engagement lugs 48, the clip 40 is relatively fitted in the engagement hole 30 of the attachment plate portion 20, and the attachment end portion 10e of the assist grip 10 is attached to the grip attachment bracket 14. FIG. 6 is a sectional view taken along the line indicated by arrows VI-VI in FIG. 5 in an assembled state where the clip 40 is assembled to the attachment plate portion 20 of the grip attachment bracket 14.

Figure 7:
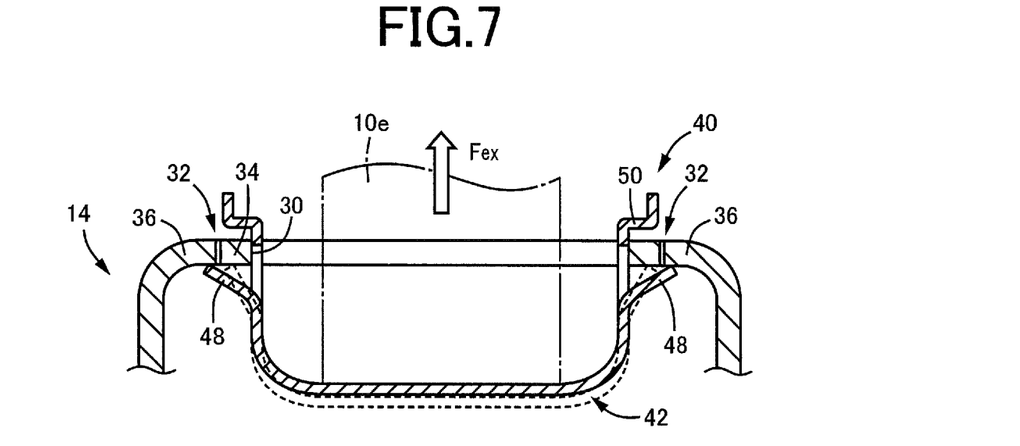
FIG. 7 is a sectional view when a tensile load Fex is applied to the assist grip with respect to the sectional view of FIG. 6.
Figure 8:
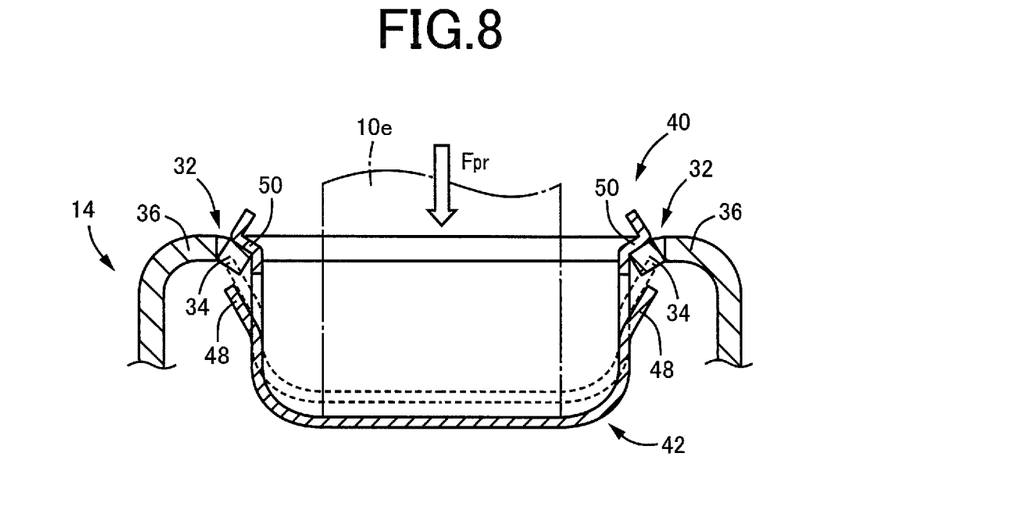
FIG. 8 is a sectional view when a pressing load Fpr is applied to the assist grip with respect to the sectional view of FIG. 6.

In a state where the attachment end portion 10e of the assist grip 10 is attached to the grip attachment bracket 14 via the clip 40 as described above, the pair of engagement lugs 48 of the clip 40 is engaged with the low-rigidity portion 34 from the side opposite to the inside of the vehicle cabin. However, when the tensile load Fex is applied to the assist grip 10, the engagement lugs 48 are elastically deformed so as to be expanded, cross the slits 32, and are engaged with the high-rigidity portion 36 as illustrated in FIG. 7. Thus, the assist grip 10 is supported with relatively high rigidity provided by the high-rigidity portion 36. On the other hand, when the pressing load Fpr is applied to the assist grip 10, the low-rigidity portion 34 is pressed and deformed from the inside of the vehicle cabin toward the opposite side via the flange portions 50 as illustrated in FIG. 8, and an impact of the pressing load Fpr is absorbed through deformation of the low-rigidity portion 34. The impact absorbing performance is determined based on the degree of weakness of the low-rigidity portion 34, that is, the ease of deformation of the low-rigidity portion 34, and can be adjusted by changing the position, the length, the intervals, the width, or the like of the slits 32 so that prescribed impact absorbing performance is obtained. It is not necessary to form the slits 32 along the whole circumference of the engagement hole 30, and the slits 32 may be formed in only both end portions in the longitudinal direction, with which the flange portions 50 are engaged. Each engagement lug 48 corresponds to a tension-side engagement portion, and each flange portion 50 corresponds to a pressing-side engagement portion. Note that a broken line in each of FIG. 7 and FIG. 8 indicates a position of the protruded portion 42 of the of the clip 40 in an attachment initial state (natural state), and the upper side of each of FIG. 7 and FIG. 8 corresponds to the inside of the vehicle cabin.

As described above, in the assist grip attachment structure according to the present embodiment, the low-rigidity portion 34 and the high-rigidity portion 36 are formed in the grip attachment bracket 14 to which the assist grip 10 is attached, and when the pressing load Fpr is applied to the assist grip 10, the flange portions 50 of the clip 40 fixedly fitted to the assist grip 10 press and deform the low-rigidity portion 34 from the inside of the vehicle cabin as illustrated in FIG. 8, so that an impact of the pressing load Fpr is appropriately absorbed through the deformation of the low-rigidity portion 34. On the other hand, when the tensile load Fex is applied to the assist grip 10, the engagement lugs 48 formed in the clip 40 are engaged with the high-rigidity portion 36 from the side opposite to the inside of the vehicle cabin as illustrated in FIG. 7, so that the assist grip 10 is supported with high rigidity by the high-rigidity portion 36. In this case, because the support rigidity with which the assist grip 10 is supported against the tensile load Fex is ensured by the rigidity of the high-rigidity portion 36, and the impact absorbing performance of absorbing an impact of the pressing load Fpr is appropriately set by adjusting the degree of weakness (ease of deformation) of the low-rigidity portion 34, it is possible to easily achieve both securing of the support rigidity against the tensile load Fex and the impact absorbing performance of absorbing an impact of the pressing load Fpr.

Further, the grip attachment bracket 14 has the attachment plate portion 20 having the engagement hole 30, in which the attachment end portion 10e of the assist grip 10 is inserted from the inside of the vehicle cabin and is engaged, and the slits 32 are formed around the engagement hole 30 and along the engagement hole 30. Thus, the portion inward of the slits 32 is used as the low-rigidity portion 34, and the portion located outward of the slits 32 is used as the high-rigidity portion 36. Therefore, by appropriately setting the position, the length, the intervals, the width, or the like of the slits 32, it is possible to easily adjust the degree of weakness of the low-rigidity portion 34, that is, the impact absorbing performance of absorbing an impact of the pressing load Fpr without affecting the support rigidity against the tensile load Fex.

Moreover, in the present embodiment, the clip 40 having a hat-shaped section is provided, and the attachment end portion 10e of the assist grip 10 is attached to the grip attachment bracket 14 via the clip 40. By just inserting the pair of engagement lugs 48 into the engagement hole 30 from the protruded portion 42 having a hat-shaped section while elastically deforming the pair of engagement lugs 48, the clip 40 is assembled to the attachment plate portion 20, and the attachment end portion 10e is attached to the grip attachment bracket 14 via the clip 40. Moreover, in the attachment state, the inner peripheral edge portion around the engagement hole 30 is located so as to be held between the flange portions 50, which serve as the pressing-side engagement portions, and the engagement lugs 48, which serve as the tension-side engagement portions. When the pressing load Fpr is applied to the assist grip 10, the flange portions 50 are engaged with the low-rigidity portion 34 from the inside of the vehicle cabin, so that an impact of the pressing load Fpr is appropriately absorbed through the deformation of the low-rigidity portion 34. On the other hand, when the tensile load Fex is applied to the assist grip 10, the engagement lugs 48 are engaged with the high-rigidity portion 36 from the side opposite to the inside of the vehicle cabin, so that the assist grip 10 is supported with high rigidity. That is, it is possible to easily attach the attachment end portion 10e of the assist grip 10 to the grip attachment bracket 14 via the clip 40. Further, the clip 40 is provided with the flange portions 50 and the engagement lugs 48, which serve as the pressing-side engagement portions and the tension-side engagement portions, respectively. In addition, the low-rigidity portion 34 is formed in the inner peripheral edge portion around the engagement hole 30 of the attachment plate portion 20 by the slits 32. Provision of the flange portions 50 and the engagement lugs 48 in addition to formation of the low-rigidity portion 34 makes it possible to easily and inexpensively obtain an attachment structure that makes it possible to appropriately achieve both the impact absorbing performance of absorbing an impact of the pressing load Fpr and the support rigidity against the tensile load Fex.

Figure 9:
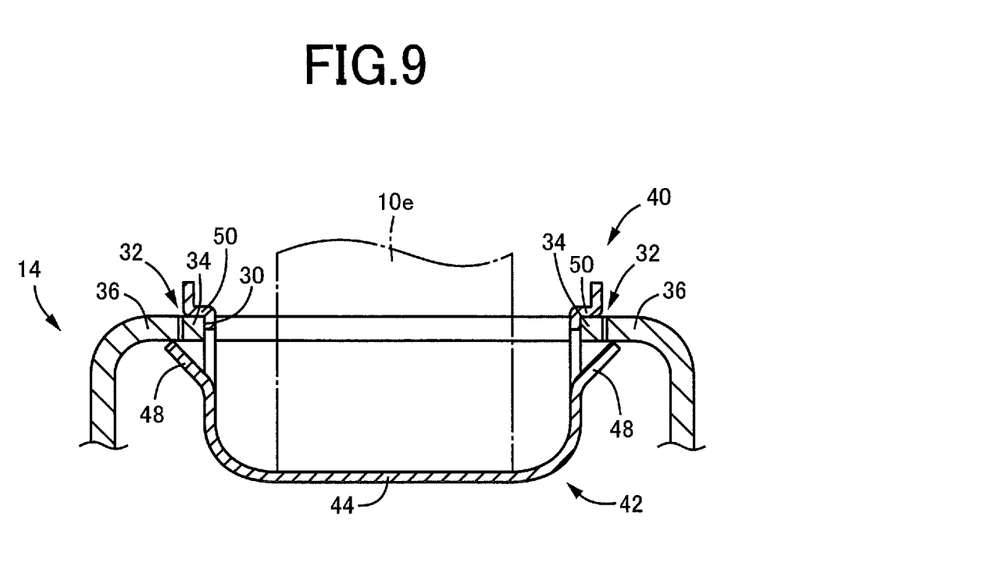
FIG. 9 is a view of another embodiment of the invention and the view is a sectional view corresponding to FIG. 6.

In the foregoing embodiment, the pair of engagement lugs 48 of the clip 40 is engaged with the low-rigidity portion 34 in the state where the attachment end portion 10e of the assist grip 10 is attached to the grip attachment bracket 14 via the clip 40. However, the engagement lugs 48 may be configured to be engaged with the high-rigidity portion 36 in an initial state (natural state) of attachment of the assist grip 10, as illustrated in FIG. 9.

Figure 10:
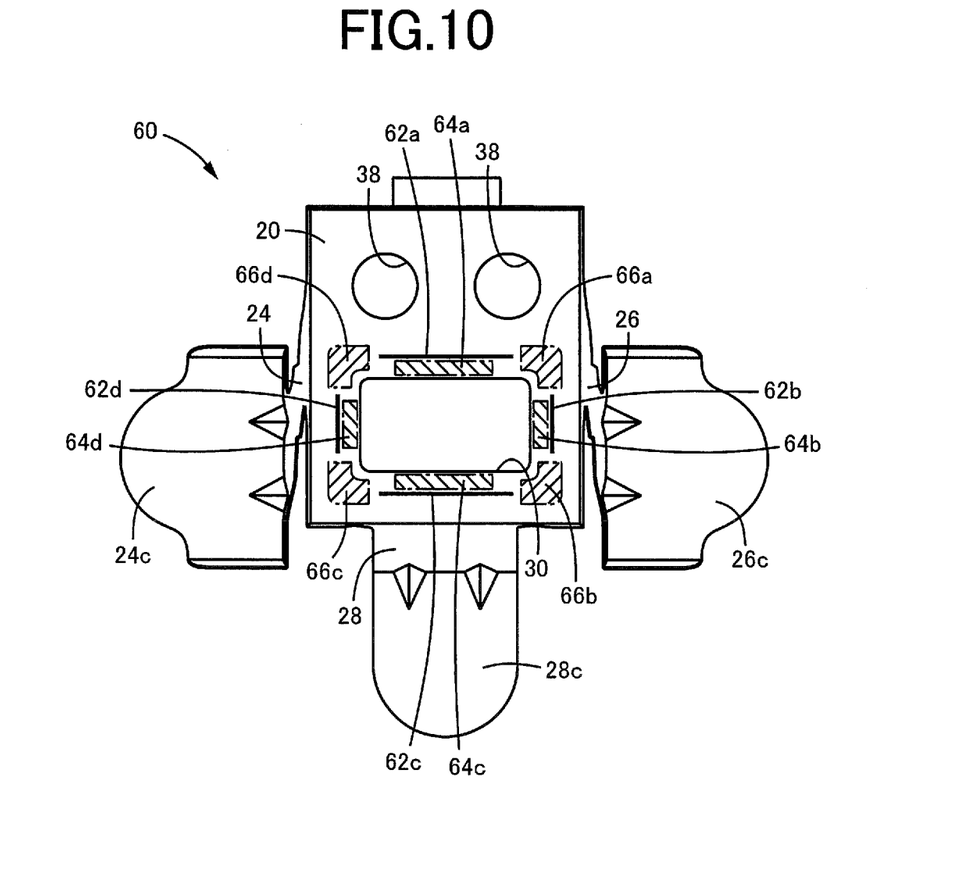
FIG. 10 is a view for explaining further embodiment of the invention and the view is a front view of the grip attachment bracket, corresponding to FIG. 2.

In the foregoing embodiment, the slits 32 are formed along the whole circumference of the engagement hole 30, in the form of a broken line. However, as in a grip attachment bracket 60 illustrated in FIG. 10, four slits 62a to 62d may be formed so as to correspond to the respective sides of the engagement hole 30, all or part of inner areas 64a to 64d at four positions inward of the slits 62a to 62d may be used as low-rigidity portions, all or part of corner areas 66a to 66d at four positions between the slits 62a to 62d may be used as high-rigidity portions.

While the embodiments of the invention have been described in detail with reference to the drawings, each of the embodiments is merely one embodiment of the invention, and the invention may be implemented in various aspects obtained by making various modifications and refinements based on knowledge of persons skilled in the art.

NOMENCLATURE OF ELEMENTS

10: assist grip 10e: attachment end portion 14, 60: grip attachment bracket (vehicle body-side attachment portion) 20: attachment plate portion 30: engagement hole 32: slits (cuts) 34: low-rigidity portion 36: high-rigidity portion 40: clip 42: protruded portion 48: engagement lug (tension-side engagement portion) 50: flange portion (pressing-side engagement portion) 62a to 62d: slits (cuts) 64a to 64d: inner areas (low-rigidity portions) 66a to 66d: corner areas (high-rigidity portions) Fpr: pressing load Fex: tensile load

The invention claimed is:

1. An assist grip attachment structure in which an assist grip is attached to a vehicle body-side attachment portion, the assist grip is supported with prescribed rigidity by the vehicle body-side attachment portion when a tensile load in a direction in which the assist grip is pulled toward an inside of a vehicle cabin is applied to the assist grip, and an impact of a pressing load is absorbed through deformation of the vehicle body-side attachment portion when the pressing load is applied to the assist grip from the inside of the vehicle cabin, the assist grip attachment structure comprising:
   a low-rigidity portion provided in the vehicle body-side attachment portion;
   a high-rigidity portion provided in the vehicle body-side attachment portion and having rigidity higher than rigidity of the low-rigidity portion;
   a pressing-side engagement portion that is fixedly fitted to the assist grip, that is engaged with the low-rigidity portion, and that presses and deforms the low-rigidity portion from the inside of the vehicle cabin when the pressing load is applied to the assist grip; and
   a tension-side engagement portion that is fixedly fitted to the assist grip, and that is engaged with the high-rigidity portion from a side opposite to the inside of the vehicle cabin when the tensile load is applied to the assist grip,
   the vehicle body-side attachment portion having an attachment plate portion having an engagement hole in which an attachment end portion of the assist grip is inserted from the inside of the vehicle cabin and is engaged, and the attachment plate portion further having
   cuts formed in the attachment plate portion, the cuts being located in a vicinity of a periphery of the engagement hole and surrounding the periphery of the engagement hole, a portion located inward of the cuts being used as the low-rigidity portion, and a portion located outward of the cuts being used as the high-rigidity portion.

2. The assist grip attachment structure according to claim 1, further comprising a clip that has a hat-shaped section, the clip including a protruded portion and a pair of flange portions that are located on opposite sides of the protruded portion, the attachment end portion of the assist grip being fixedly fitted to an inner side of the protruded portion, wherein
   the protruded portion of the clip is inserted into the engagement hole from the inside of the vehicle cabin, and the pair of flange portions of the clip is engaged with the low-rigidity portion from the inside of the vehicle cabin, the pair of flange portions serving as the pressing-side engagement portion,
   in a pair of sidewalls of the protruded portion of the clip, a pair of engagement lugs is formed in such a manner that sides of the engagement lugs, which are close to the flange portions, are cut and raised so as to protrude outward from the protruded portion, when the protruded portion is inserted into the engagement hole from the inside of the vehicle cabin, the engagement lugs are elastically deformed inward, so that the protruded portion is allowed to pass through the engagement hole and the engagement lugs are engaged with the high-rigidity portion from the side opposite to the inside of the vehicle cabin, the pair of engagement lugs serving as the tension-side engagement portion, and the clip is assembled to the attachment plate portion in such a manner that an inner peripheral edge portion around the engagement hole in the attachment plate portion is located between the pair of flange portions and the pair of engagement lugs.

3. The assist grip attachment structure according to claim 1, wherein the vehicle body-side attachment portion is to be jointed to a body of a vehicle.

4. The assist grip attachment structure according to claim 3, wherein the vehicle body-side attachment portion is to be jointed at a jointed portion thereof to the body of the vehicle, and wherein the low-rigidity portion is located closer to the periphery of the engaging hole than the high-rigidity portion, and the high-rigidity portion is located closer to the jointed portion than the low-rigidity portion.

* * * * *